United States Patent [19]

Hettiger

[11] Patent Number: 4,558,355

[45] Date of Patent: Dec. 10, 1985

[54] TRILEVEL SANDCASTLE PULSE ENCODER

[75] Inventor: James Hettiger, Indianapolis, Ind.

[73] Assignee: RCA Corporation, Princeton, N.J.

[21] Appl. No.: 561,333

[22] Filed: Dec. 14, 1983

[51] Int. Cl.$^4$ .............................................. H04N 9/16
[52] U.S. Cl. ...................................... 358/74; 358/243; 307/264
[58] Field of Search ................. 358/20, 21 R, 74, 243; 375/104; 307/264, 473

[56] References Cited

U.S. PATENT DOCUMENTS 4,313,130 1/1982 Yost ................................... 358/21 R
4,316,214 2/1982 Yost ..................................... 358/20

OTHER PUBLICATIONS

"Integrated NTSC Chrominance/Luminance Processor"-Harwood, et al., IEEE Trans. on Consumer El. (vol. CE-26), Nov. 1980, pp. 693-706.

Primary Examiner—John C. Martin
Assistant Examiner—George Andrews
Attorney, Agent, or Firm—Eugene M. Whitacre; Paul J. Rasmussen; William H. Meagher

[57] ABSTRACT

In a color TV receiver incorporating automatic kinescope bias (AKB) control circuits, a first train of monolevel pulses with timing suitable for retrace blanking purposes and a second train of monolevel pulses with "backporch" timing appropriate for burst gating purposes are applied to a circuit serving to generate at a first terminal a train of bilevel pulses exhibiting a first voltage level during periods of overlapping of the pulses of the first and second trains, and exhibiting a second, lesser voltage level during the remaining, non-overlapping portions of the pulses of the first train. A resistor interconnects the first terminal with a second terminal. A keyed voltage source, responsive to a third train of monolevel pulses timed to indicate recurring kinescope bias control intervals, develops a voltage of a third level, intermediate the first and second voltage levels, at the second terminal during the recurring control intervals. The keyed voltage source exhibits, during the control intervals, an output impedance significantly lower than the impedance exhibited by the interconnecting resistor. During periods intervening successive ones of the control intervals, the voltage source is effectively disabled and exhibits an output impedance significantly higher than the impedance exhibited by the resistor.

5 Claims, 3 Drawing Figures

TRILEVEL SANDCASTLE PULSE ENCODER

The present invention relates generally to encoder apparatus for forming a multilevel pulse train of the so-called "sandcastle" type, and particularly to an encoder of sandcastle pulses of a trilevel form.

Where a multiplicity of keying functions with different timing requirements are subject to performance within a common integrated circuit, a savings in terminal count may be realized by externally forming a composite, multilevel keying waveform for delivery to a single input terminal of the integrated circuit, and including within the integrated circuit level-sensitive decoder circuits for extracting respective keying waves of different timing from the delivered composite waveform (which is viewable as having a sandcastle-like profile).

An example of encoder circuitry suitable for use in the formation of a sandcastle pulse train with pulse components of two different levels (above a base level) is shown in U.S. Pat. No. 4,313,130—Yost. An example of decoder circuitry suitable for use in separating the pulse components of bilevel sandcastle pulses of the type generated by the Yost encoder is presented in an article entitled "Integrated NTSC Chrominance/Luminance Processor", by L. Harwood, et al., appearing on pages 693–706 of the IEEE Transactions on Consumer Electronics, Volume CE-26 (November 1980).

In the example of the above-discussed Harwood, et al. decoder, a retrace blanking waveform and a burst gating waveform, for use in luminance/chrominance signal processing circuits of a color television receiver, are separately derived from bilevel sandcastle pulses. The bilevel sandcastle pulses exhibit a first level during initial and concluding portions of the recurring periods when retrace blanking is desired, but exhibit a second higher level during intermediate ("backporch") portions of the recurring periods, which intermediate portions coincide in timing with recurring intervals during which the burst gating function is to be performed. In this instance of sandcastle pulse use, there is an overlap of the keying functions to be performed, with retrace blanking continuing through each burst gating period. In the instance of a color television receiver of the type incorporating apparatus for automatic control of color kinescope biasing, a set of keying functions, inclusive of non-overlapping as well as overlapping functions, is desirably associated with the receiver's luminance/chrominance signal processing circuits, as explained in the copending U.S. Patent application Ser. No. 561,176 R. Shanley, concurrently filed herewith and entitled "Control System For Luminance/Chrominance Signal Processing Circuits."

An illustrative arrangement for automatic control of color kinescope biasing in a color television receiver is that described in U.S. Pat. No. 4,263,622—Hinn. In the Hinn arrangement, a control period, occupying a period of several successive line intervals within each vertical blanking interval, is set aside for monitoring a black level current produced by an electron gun under reference signal conditions, for detection of departures from a desired current level, and for readjustment of gun bias to oppose the undesired departures. During a portion of the control period, the color kinescope grid receives a conduction-enhancing pulse; bias control is based upon information derived as indicative of the change in cathode current level introduced by the grid pulsing. An advantageous system for utilization of the above-described Hinn approach in maintenance of an appropriate bias relationship among the color kinescope's gun trio (in the face of aging and other parameter variations) is described in the U.S. patent No. Ser. No. 4,484,228 of R. P. Parker.

For successful use of automatic kinescope bias (AKB) control in the manner exemplified by the structures of the aforementioned Hinn patent and Parker patent, it is recognized in the aforementioned Shanley application that the luminance/chrominance signal processing circuits, which process signal information for delivery to the color kinescope during the time periods intervening the periodically recurring kinescope bias control intervals, require some suitable form of manipulation during the kinescope bias control intervals to avoid undesirable disturbance or contamination of the current monitoring and bias adjustment functions.

To convey to a single chip input terminal timing information identifying the recurring kinescope bias control intervals, in addition to the timing information conveyed by the bilevel sandcastle pulses discussed above, it is proposed herein to employ encoder apparatus for forming sandcastle pulses of a trilevel form, i.e., with three different levels (above a base level) for the respective pulse components.

In accordance with the principles of the present invention, indication of a control interval's timing is associated with an intermediate voltage level falling between low and high voltage levels associated with additional, overlapping pulse components of a sandcastle pulse train. To simplify design requirements for decoder apparatus effecting recovery of control interval timing information from the trilevel sandcastle pulses, the encoder apparatus is arranged so as to preclude sandcastle pulse excursions away from the intermediate voltage level during the recurring control intervals.

A trilevel sandcastle pulse encoder, in accordance with an illustrative embodiment of the present invention, includes: a source of a first train of monolevel pulses (e.g., line and field rate pulses with timing appropriate for retrace blanking purposes); a source of a second train of monolevel pulses (e.g., line rate pulses with "backporch" timing appropriate for burst gating purposes), with each of the pulses of the second train overlapping in time a portion of a pulse of said first train; and a source of a third train of monolevel pulses timed to coincide with recurring control intervals (e.g., field rate pulses coinciding with the kinescope bias control intervals).

Means, coupled to the sources of the first and second trains of pulses, are provided for developing at a first terminal a train of bilevel pulses exhibiting a first voltage level during periods of overlapping of the pulses of the first and second trains, and exhibiting a second, lesser voltage level during the remaining, non-overlapping portions of the pulses of the first train. A resistor interconnects the first terminal with a second terminal. Keyed means, coupled to the source of the third train of pulses, are provided for developing a voltage of a third level, intermediate the first and second voltage levels, at the second terminal during the recurring control intervals. The keyed voltage developing means exhibits, during the control intervals, an output impedance significantly lower than the impedance exhibited by the interconnecting resistor; however, during the periods intervening successive ones of the control intervals, the voltage developing means is effectively disabled and exhibts an output impedance significantly higher than the impedance exhibited by the resistor.

Due to the impedance relationship exhibited during the control intervals, the potential at the second terminal is held at the intermediate voltage level, independent of excursions of the bilevel pulses at the first terminal during the control intervals. In contrast, due to the differing impedance relationship exhibited during the intervening periods, the potential at the second terminal is free to follow signal excursions at the first terminal during the intervening periods.

Figure 1:
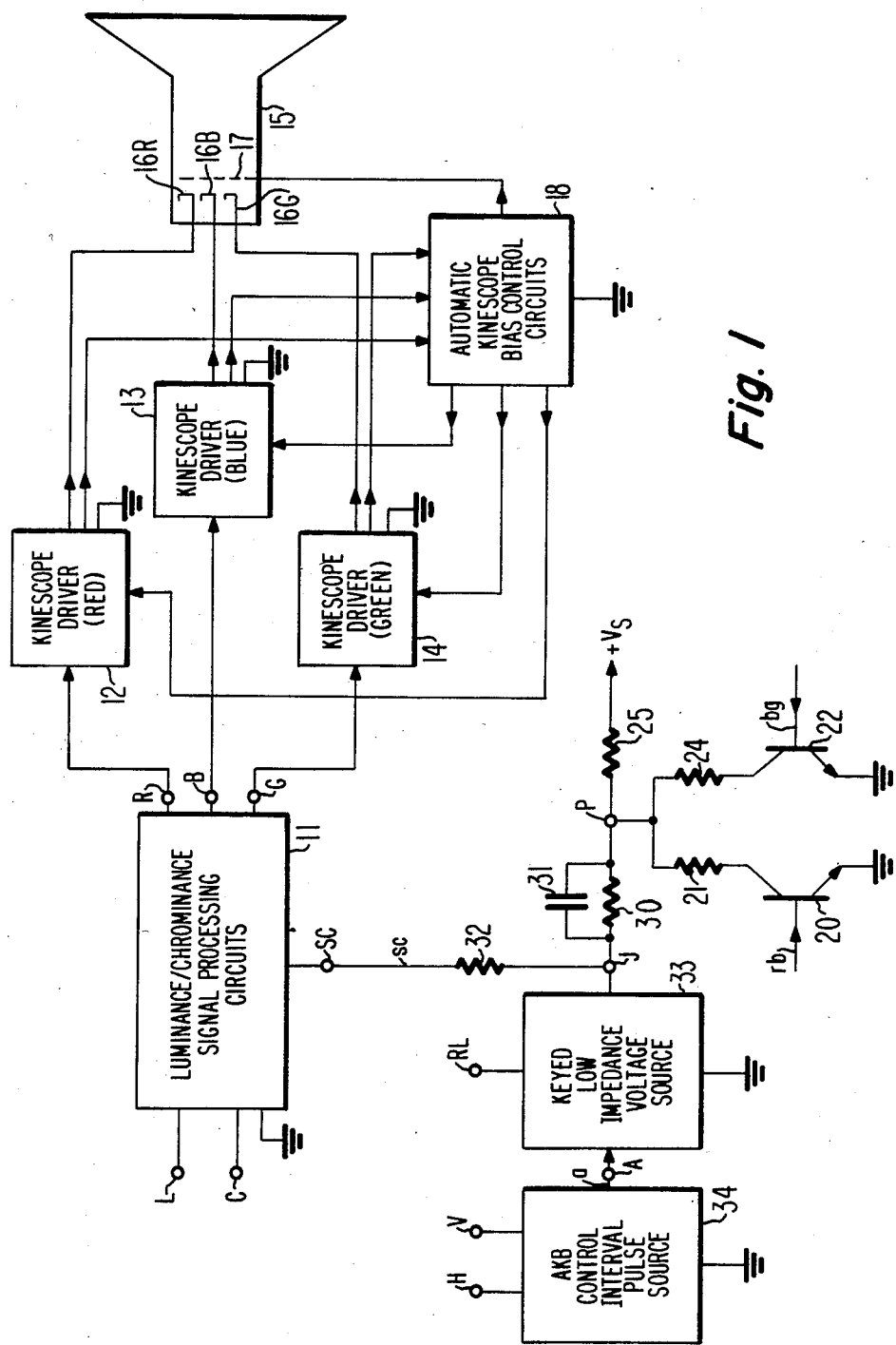
FIG. 1 illustrates, partially schematically and partially by block representation, a portion of a color television receiver incorporating a trilevel sandcastle pulse encoder embodying the principles of the present invention.

In FIG. 1, the luminance signal component of composite video signals received by a color television receiver appears at a luminance signal input terminal L, while the accompanying chrominance component appears at a chrominance signal input terminal C. Illustratively, the respective signals appearing at terminals L and C may comprise the respective luminance and chrominance signal outputs of comb filter apparatus of the type shown in U.S. Pat. No. 4,096,516—Pritchard, for example.

The signals appearing at terminals L and C are supplied as inputs to luminance/chrominance signal processing circuits 11, employed in the receiver to develop from the received signal components a set of red, blue and green color signals at respective processor output terminals R, B and G. These color signal outputs are used by a trio of kinescope drivers 12, 13, 14, responsive, respectively, to the red color signal appearing at terminal R, the blue color signal appearing at terminal B, and the green color signal appearing at terminal G.

Display of color images in response to the trio of color signals is effected on the viewing screen of a color kinescope 15, incorporating an electron gun assembly comprising individually energized cathode electrodes 16R, 16B, and 16G, and a commonly energized control grid structure 17. The red content of the displayed color image is determined by control of the intensity of an electron beam emanating from cathode 16R, which is driven by an output of kinescope driver 12. The blue content of the displayed color image is determined by control of the intensity of an electron beam emanating from cathode 16B, which is driven by an output of kinescope driver 13. The green content of the displayed color image is determined by control of the intensity of an electron beam emanating from cathode 16G, which is driven by an output of kinescope driver 14.

The FIG. 1 apparatus also includes automatic kinescope bias control circuits 18, which desirably operate in the manner described in the aforementioned copending Parker patent application. Thus, the bias control circuits 18 include means for supplying a beam conduction-enhancing pulse to the kinescope control grid structure 17 during a predetermined portion of each kinescope bias control interval (which interval, illustratively, occupies a seven-line period during a post-sync portion of each vertical blanking interval of the received signal). The bias control circuits 18 are responsive to inputs derived from the respective drivers (12, 13, 14) for sensing beam current changes induced by the grid pulsing, and develop therefrom respective DC outputs for application to the respective drivers (12, 13, 14) to suitably control the biases of the respective kinescope cathodes (16R, 16B, 16G), to which the driver outputs are DC coupled.

Illustratively, a plurality of the functions performed by the luminance/chrominance signal processing circuits 11 are implemented by circuitry realized in integrated circuit form on a common IC chip. For a number of conventional control purposes, such as burst gating and retrace blanking, it is necessary to supply appropriate timing information to the on-chip circuitry. Additionally, as explained in the aforementioned copending Shanley application, protection of the integrity of the bias control operations carried out by bias control circuits 18 requires adjustments of the luminance/chrominance signal processing circuits 11 which are suitably timed to coincide with the recurring kinescope bias control intervals, wherefore additional timing information is also required to be delivered to the on-chip circuitry.

Pursuant to the present invention, the supply of timing information of the above-described nature is effected through the delivery of a train of sandcastle pulses of trilevel form to an input terminal SC of the luminance/chrominance signal processing cicuits 11. Terminal SC illustratively comprises an interface terminal of the integrated circuit upon which the luminance/chrominance signal processing circuits are realized. The copending U.S. patent application Ser. No. 561,331 of L. Harwood, et al., entitled "Trilevel Sandcastle Pulse Decoder" and concurrently filed herewith, discloses level-sensitive decoding circuits which may be implemented on the same integrated circuit with the luminance/chrominance signal processing circuits and utilized to develop appropriate keying waveforms for a variety of processing circuit control functions in response to the trilevel sandcastle pulses delivered to terminal SC.

Figure 3:
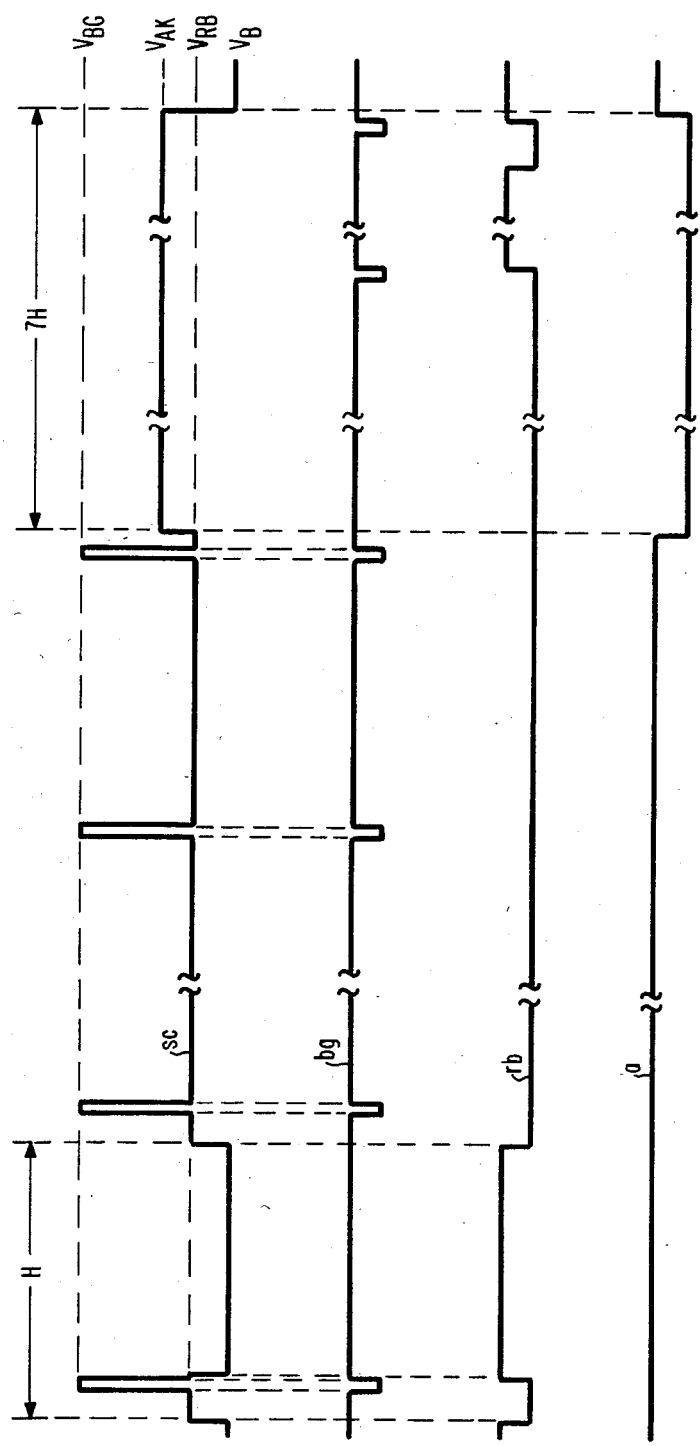
FIG. 3 illustrates graphically waveforms of aid in explaining the operation of the FIG. 1 arrangement.

The circuitry of FIG. 1 includes first and second NPN transistors 20, 22, disposed with their emitter electrodes directly connected to the grounded negative terminal of an operating potential supply. The collector electrodes of transistors 20 and 22 are connected via respective resistors 21 and 24 to a terminal P, linked by a resistor 25 to the positive terminal ($+V_S$) of the operating potential supply. Curve "rb" of FIG. 3 illustrates the waveform of a train of negative-going retrace blanking pulses of monolevel form which are applied to the base electrode of transistor 20, while curve "bg" of FIG. 3 illustrates the waveform of a train of negative-going burst gating pulses of monolevel form which are applied to the base electrode of transistor 22.

The retrace blanking waveform "rb" includes wide pulse components, recurring at a field rate, which encompass the recurring periods of vertical retrace of the beams of color kinescope 15, and narrower pulse components, recurring at a line rate, which encompass periods of horizontal retrace of the beams lying outside of the vertical retrace blanking intervals. The retrace blanking waveform "rb" can be developed in a conventional manner from suitably timed signals derived from the receiver's vertical and horizontal deflection circuits (not illustrated).

The burst gating waveform "bg" includes pulse components, narrower in width than the horizontal retrace blanking pulse components, which are timed to coincide with "backporch" segments of the horizontal blanking portion of recurring line intervals of the received signal. Illustrative circuitry for developing the burst gating waveform "bg" is disclosed in the copending U.S. patent application, Ser. No. 527,889 of R. Fernsler, et al.

During the appearance of a negative-going retrace blanking pulse component at the base electrode of transistor 20, transistor 20 is cut off. During the periods intervening the successive retrace blanking pulse components, transistor 20 is strongly conducting. During the appearance of a negative-going burst gating pulse component at the base electrode of transistor 22, transistor 22 is cut off. During the periods intervening the successive burst gating pulse components, transistor 22 is strongly conducting.

As a consequence of the above-described operations, a train of sandcastle pulses of bilevel form is developed at terminal P. During periods of coincidence of the base levels of waveforms "rb" and "bg" (e.g., during trace portions of active line intervals), transistors 20 and 22 are simultaneously conducting. Under these circumstances, a first voltage divider is formed across the operating potential supply, which divider comprises resistor 25 in series with the parallel combination of resistors 21 and 24. The voltage division ratio of this first voltage divider is such as to establish a base level for the bilevel sandcastle pulse train at terminal P at a relatively low positive potential.

During appearances of those portions of each retrace blanking pulse component of waveform "rb" which do not coincide with appearances of the burst gating pulse components of waveform "bg", transistor 20 is cut off while transistor 22 continues in a conducting state. Under such circumstances, resistor 21 is open-circuited and a second voltage divider is formed across the operating potential supply, which second voltage divider comprises resistor 25 in series with resistor 24 only. The voltage division ratio of the second voltage divider is such as to elevate the potential at terminal P to a first pulse level more positive than the aforementioned base level.

During appearances of the burst gating pulse components of waveform "bg" (which always coincide with appearances of portions of the retrace blanking pulse components of waveform "rb"), transistors 20 and 22 are simultaneously cut off. Under such circumstances, resistors 21 and 24 are both open-circuited, and the potential at terminal P rises to a second pulse level, higher than the first pulse level, at, or in the vicinity of, the potential at supply terminal $V_S$.

The arrangement of FIG. 1 also includes an AKB control interval pulse source 34. Pulse source 34 functions in response to horizontal sync pulse and vertical sync pulse components, derived from the received signal in a conventional manner by the receiver's sync separator (not illustrated), and delivered to respective input terminals H and V of pulse source 34, to develop at output terminal A a train of negative-going AKB control interval timing pulses of monolevel form, as illustrated by waveform "a" of FIG. 3. The AKB control interval timing waveform "a" comprises pulse components recurring at a field rate and timed to encompass a period of seven line intervals duration occurring during a post-sync portion of each vertical blanking interval of the received signals. A logic arrangement suitable for use in development of the waveform "a" is disclosed, for example, in the aforementioned Parker patent.

The timing pulse train output of pulse source 34 at terminal A is supplied as a keying wave input to a keyed low impedance voltage source 33. The output of voltage source 33 is developed at terminal J, linked by a resistor 30 to the aforementioned terminal P. Resistor 30 is shunted by a capacitor 31. Voltage source 33 is configured to develop an output potential which is intermediate the aforementioned first and second pulse levels during keying intervals defined by the recurring pulse components of waveform "a", and exhibits an output impedance during such output voltage development which is significantly lower than the impedance exhibited by resistor 30. As a consequence, terminal J is effectively clamped to the aforesaid intermediate voltage level throughout each such keying interval, and the potential at terminal J is thus rendered substantially independent of the voltage excursions occuring at terminal P during the keying intervals. Voltage source 33 is further configured to cause its output to be effectively open-circuited during the periods intervening successive pulse components of waveform "a", voltage source 33 thus exhibiting, during said intervening periods, an output impedance appreciably higher than the impedance presented by resistor 30 so that the potential at terminal J is free to follow the voltage excursions at terminal P. An example of circuitry suitable for performing the functions of the keyed low impedance voltage source 33 is presented in FIG. 2 (to be subsequently described) and is the subject of a copending U.S. patent application Ser. No. 561,334 of P. Filliman, entitled "Keyed Low Impedance Voltage Source" and concurrently filed herewith.

As a consequence of the above-described operation of the keyed low impedance voltage source 33, there is developed at terminal J a sandcastle pulse train of the desired trilevel form. This sandcastle pulse train is delivered to input terminal SC of the luminance/chrominance signal processing IC via a resistor 32. Curve "sc" of FIG. 3 is illustrative of the waveform of the delivered trilevel sandcastle pulses.

As indicated by waveform "sc", the trilevel sandcastle pulse train exhibits an intermediate pulse level ($V_{AK}$) throughout an AKB control interval defined by each pulse component of waveform "a". During periods outside the AKB control intervals, the trilevel sandcastle pulse train exhibits appropriately timed voltage excursions between a (least positive) base level ($V_B$), a retrace blanking pulse level ($V_{RB}$) which is intermediate $V_B$ and $V_{AK}$, and a burst gating pulse level ($V_{BG}$) which is more positive than $V_{AK}$.

The keyed low impedance voltage source 33 of FIG. 1 is desirably configured to receive a reference voltage input at a reference level input terminal RL, with the reference voltage input determinative of the output voltage developed by source 33 during each keying interval. Desirably, the reference voltage input delivered to terminal RL is derived from a voltage divider coupled across a DC supply, with a further voltage divider coupled across the same DC supply utilized to develop reference voltages for use in a plurality of comparators employed in the on-chip sandcastle pulse decoder, with resultant tracking advantages, as described in greater detail in the copending U.S. patent application Ser. No. 561,330 of J. Hettiger, entitled "Trilevel Sandcastle Pulse Encoding/Decoding System" and concurrently filed herewith. As further explained in said copending Hettiger patent application, the DC supply associated with terminal $+V_S$ and the development of the bilevel sandcastle pulse train at terminal P may advantageously be the same DC supply utilized in the aforementioned reference voltage developments.

Figure 2:
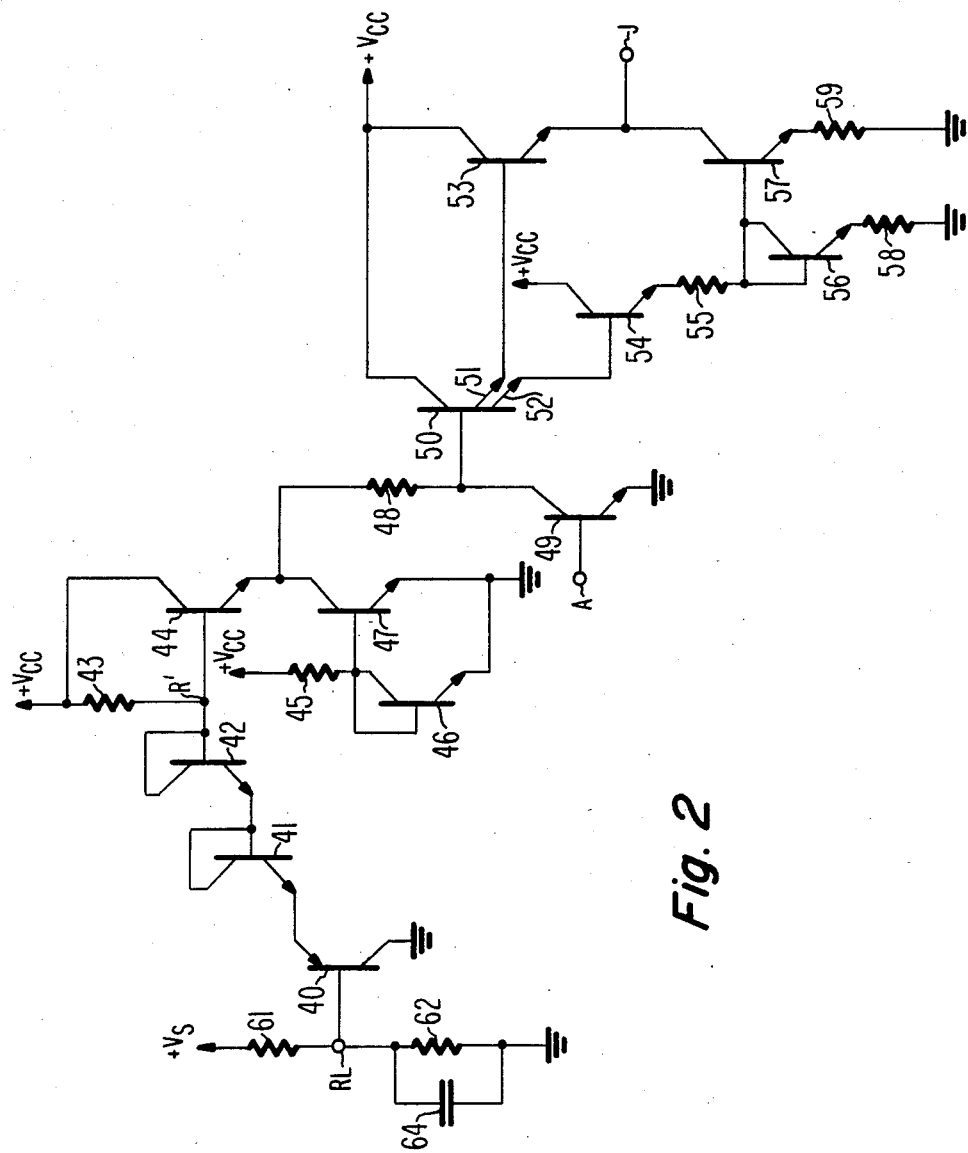
FIG. 2 illustrates schematically apparatus that may be employed to implement a keyed voltage source function in the arrangement of FIG. 1.

As shown in FIG. 2, the reference voltage delivered to the reference level input terminal RL of the keyed voltage source 33 is derived from the junction of a pair of voltage divider resistors 61, 62, connected in series between the $+V_S$ supply terminal and ground. Filter capacitor 64 shunts divider resistor 62. Input terminal RL is directly connected to the base electrode of a PNP transistor 40, disposed with its collector electrode grounded. The emitter electrode of transistor 40 is directly connected to the emitter electrode of a first diode-connected NPN transistor 41. The joined base and collector electrodes of transistor 41 are directly connected to the emitter electrode of a second diode-connected transistor 42. The joined base and collector electrodes of transistor 42 are connected via a resistor 43 to the positive terminal ($+V_{cc}$) of an operating potential supply different from that associated with terminal $+V_S$.

Current supplied via resistor 43 forward biases the base-emitter junctions of transistors 40, 41, 42, resulting in development of a potential at terminal R' (at the junction of resistor 43 and transistor 42) which is offset in the positive direction from the reference voltage at terminal RL by a voltage ($3V_{be}$) equal to three times the magnitude of the offset potential ($V_{be}$) exhibited by a forward biased base-emitter junction.

Terminal R' is directly connected to the base electrode of an NPN transistor 44 disposed as an emitter-follower, with its collector electrode directly connected to the $+V_{cc}$ supply terminal. An NPN transistor 47, disposed with its collector electrode directly connected to the emitter electrode of transistor 44, and with its emitter electrode grounded, serves as a current source for the emitter-follower transistor 44. The current drawn by the current source transistor 47 is determined by a biasing circuit comprising a resistor 45 connected between the $+V_{cc}$ supply terminal and the base electrode of transistor 47, and a diode-connected NPN transistor 46 shunting the base-emitter path of transistor 47. The diode-connected transistor 46 is disposed with its joined base and collector electrodes directly connected to the base electrode of transistor 47, and with its emitter electrode grounded.

A resistor 48 links the emitter electrode of the emitter-follower transistor 44 to the base electrode of a multiple-emitter NPN transistor 50, disposed with its collector electrode directly connected to the $+V_{cc}$ supply terminal. An NPN control transistor 49 is disposed with its collector electrode directly connected to the base electrode of the multiple-emitter transistor 50, with its emitter electrode grounded, and with its base electrode connected to the voltage sources's keying wave input terminal A.

A first emitter electrode (51) of transistor 50 is directly connected to the base electrode of a first NPN output transistor 53. Output transistor 53 is arranged with its emitter electrode directly connected to the voltage source's output terminal J, and with its collector electrode directly connected to the $+V_{cc}$ supply terminal.

A second emitter electrode (52) of transistor 50 is directly connected to the base electrode of an NPN emitter-follower transistor 54, disposed with its collector electrode directly connected to the $+V_{cc}$ supply terminal. A resistor 55 links the emitter electrode of emitter-follower transistor 54 to the base electrode of a second NPN output transistor 57, disposed with its collector electrode directly connected to output terminal J. A resistor 59 returns the emitter electrode of output transistor 57 to ground. A diode-connected NPN transistor 56 is arranged with its joined base and collector electrodes directly connected to the base electrode of output transistor 57, and with its emitter electrode returned to ground via a resistor 58.

In operation of the FIG. 2 arrangement, when a negative-going AKB control interval timing pulse component of waveform "a" appears at the keying wave input terminal A, control transistor 49 is cut off. Under these circumstances, the potential at the base electrode of transistor 50 is elevated sufficiently to enable transistors 50, 53, 55, 56 and 57 to simultaneously conduct. With output transistors 53 and 57 conducting, the voltage source 33 presents a very low impedance to output terminal J, and establishes a potential thereat which is offset in a negative direction from the potential at terminal R' by a $3V_{be}$ amount (neglecting as insignificant the slight voltage drop developed across resistor 48 by the base current of the conducting transistor 50). With the negative offset introduced by the voltage drops across the forward-biased base-emitter junctions of transistors 44, 50 and 53 effectively canceling the effects of the positive offset introduced by the voltage drops across the forward-biased base-emitter junctions of transistors 40, 41 and 42, the output potential at terminal J during each keying interval is directly determined by (and in this instance, substantially equal to) the reference voltage at the reference level input terminal RL, and is effectively independent of the supply potential at the operating potential supply terminal $+V_{cc}$, and any variations to which such supply potential may be subject.

During periods outside the AKB control interval, when waveform "a" at the keying wave input terminal A exhibits its base level, control transistor 49 is rendered conducting to depress the potential at the base electrode of transistor 50 sufficiently so as to disable transistors 50, 53, 55, 56 and 57. With output transistors 53 and 57 simultaneously cut off under these circumstances, the voltage source output is effectively open-circuited and output terminal J is freed for control by circuitry external to the voltage source 33.

Illustrative values for circuit parameters of the arrangements shown in FIGS. 1 and 2 are, as follows:

| | |
|---|---|
| Resistor 21 | 510 ohms |
| Resistor 24 | 1200 ohms |
| Resistor 25 | 2200 ohms |
| Resistor 30 | 680 ohms |
| Capacitor 31 | 1000 pf. |
| Resistor 32 | 220 ohms |
| Resistor 61 | 5100 ohms |
| Resistor 62 | 6200 ohms |
| Capacitor 64 | .01 microfarad |
| Resistor 43 | 3 kilohms |
| Resistor 45 | 18 kilohms |
| Resistor 48 | 18 kilohms |
| Resistor 55 | 1300 ohms |
| Resistor 58 | 500 ohms |
| Resistor 59 | 400 ohms |

One contemplated use of burst gating pulse components, separated from the trilevel sandcastle pulses at terminal SC by suitable on-chip decoder circuitry, is for voltage comparator keying in an on-chip system for stabilization of the DC levels of the color signal outputs at terminals G, B and R. In a copending U.S. patent application Ser. No. 561,280 of R. Shanley, et al., entitled "Keyed DC Stabilization System With Protection From Error Introduction During Vertical Sync Interval" and concurrently filed herewith, it is recognized as desirable, for error reduction purposes, that keying of the stabilization system's comparators should be precluded during at least a portion of each vertical sync interval of the received signal. Moreover, it is proposed, therein to ensure such keying prevention, that the trilevel sandcastle pulses which are delivered to the luminance/chrominance IC should be freed of at least some of the burst gating pulse components during the vertical sync interval. A desirable technique for achieving the selective elimination of the burst gating pulse components is disclosed in a copending U.S. patent application Ser. No. 561,332 of T. Yost, entitled "Backporch Gating Pulse Generator Subject to Disabling During Vertical Sync Interval" and concurrently filed herewith. In the Yost patent application, a modification of the burst gating pulse generator circuitry disclosed in the aforementioned copending Fernsler, et al application is disclosed in which gating pulse generation is suppressed throughout a selected portion of each vertical sync interval.)

Accordingly, in one contemplated embodiment of the present invention, the burst gating pulse generator employed to supply an input to transistor 22 in the FIG. 1 arrangement desirably incorporates gating pulse generation suppression during vertical sync intervals in the manner of the aforementioned Yost patent application. In such an arrangement, the monolevel pulse train delivered to the base electrode of transistor 22 will exhibit a version of the waveform "bg" in which burst gating pulses are absent during at least a selected portion of the vertical sync interval. The resultant trilevel sandcastle pulse train appearing at terminal SC will conform to a version of the waveform "sc" in which excursions to the $V_{BG}$ level are absent throughout the selected portion of vertical sync interval.

What is claimed is:

1. Trilevel sandcastle pulse encoding apparatus comprising:
    a source of a first train of recurring monolevel pulses;
    a source of a second train of recurring monolevel pulses, each of the pulses of said second train overlapping in time a portion of a pulse of said first train;
    a source of a third train of recurring monolevel pulses timed to coincide with periodically recurring control intervals;
    means, coupled to said source of said first train of pulses and to said source of said second train of pulses, for developing at a first terminal a train of bilevel pulses exhibiting a first voltage level during periods of overlapping of said pulses of said first and second trains, and exhibiting a second, lesser voltage level during the remaining, non-overlapping portions of the pulses of said first train;
    a resistor interconnecting said first terminal and a second terminal; and
    keyed means, coupled to said source of said third train of pulses, for developing a voltage of a third level, intermediate said first and second voltage levels, at said second terminal during said recurring control intervals; said voltage developing means exhibiting, during said control intervals, an output impedance significantly lower than the impedance exhibited by said resistor; said voltage developing means being effectively disabled during the periods intervening between successive ones of said control intervals and exhibiting, during said intervening periods, an output impedance significantly higher than the impedance exhibited by said resistor.

2. Apparatus in accordance with claim 1 wherein said bilevel pulse train developing means includes:
    a first transistor having base, emitter and collector electrodes;
    a second resistor connected between the collector electrode of said first transistor and said first terminal;
    a second transistor having base, emitter and collector electrodes;
    a third resistor connected between the collector electrode of said second transistor and said first terminal;
    a fourth resistor connected between said first terminal and an operating potential supply terminal;
    a source of DC potential connected between the emitter electrodes of said first and second transistors and said operating potential supply terminal;
    means for applying said first train of pulses to the base electrode of said first transistor with a sense causing said first transistor to be non-conductive only during appearances of the pulses of said first train; and
    means for applying said second train of pulses to the base electrodes of said second transistor with a sense causing said second transistor to be non-conductive only during appearances of the pulses of said second train.

3. In a color television receiver for displaying color images in response to composite video signals inclusive of respective image-representative luminance and chrominance components, said image-representative components being absent during horizontal blanking portions of successive line intervals within periodic field intervals, and also absent during the vertical blanking portion of each field interval, said receiver including: a color kinescope having a plurality of beam intensity control electrodes for controlling the intensity of a plurality of electron beams tracing a raster of scanning lines upon a viewing screen; means, responsive to said image-representative luminance and chrominance components, for forming respective first, second and third color signals; means for applying each of said color signals to a respectively different one of said beam intensity control electrodes; and means for automatically controlling the bias on the respective control electrodes during periodic bias control intervals encompassing a plurality of successive line intervals within each of said vertical blanking portions; apparatus comprising the combination of:
    a source of a first train of pulses inclusive of (a) recurring field rate pulses timed to substantially encompass vertical retrace periods for said beams, and (b) recurring line rate pulses, subject to interruption during said vertical retrace periods, and each timed to substantially encompass a horizontal retrace period for said beams;

a source of a second train of pulses recurring at a line rate, each of the pulses of said second train overlapping in time a portion of a pulse of said first train, with pulses of said second train timed to substantially coincide with backporch segments of said horizontal blanking portions;

a source of a third train of pulses recurring at a field rate and timed to substantially coincide with said bias control intervals;

means, coupled to said source of said first train of pulses and to said source of second train of pulses, for developing at a first terminal a train of bilevel pulses exhibiting a first voltage level during periods of overlapping of said pulses of said first and second trains, and exhibiting a second, lesser voltage level during the remaining, non-overlapping portions of the pulses of said first train;

a resistor interconnecting said first terminal and a second terminal;

keyed means, coupled to said source of said third train of pulses, for developing a voltage of a third level, intermediate said first and second levels, at said second terminal during said bias control intervals; said voltage developing means exhibiting, during said bias control intervals, an output impedance significantly lower than the impedance exhibited by said resistor; said voltage developing means being effectively disabled during the periods intervening between successive bias control intervals and exhibiting, during said intervening periods, an output impedance significantly higher than the impedance exhibited by said resistor; and means, coupled to said second terminal, for supplying a train of trilevel pulses, exhibiting said third voltage level throughout said bias control intervals, to said color signal forming means.

4. Apparatus in accordance with claim 3 wherein said bilevel pulse train developing means includes:

a first transistor having base, emitter and collector electrodes;

a second resistor connected between the collector electrode of said first transistor and said first terminal;

a second transistor having base, emitter and collector electrodes;

a third resistor connected between the collector electrode of said second transistor and said first terminal;

a fourth resistor connected between said first terminal and an operating potential supply terminal;

a source of DC potential connected between the emitter electrodes of said first and second transistors and said operating potential supply terminal;

means for applying said first train of pulses to the base electrode of said first transistor with a sense causing said first transistor to be non-conductive only during appearances of the pulses of said first train; and means for applying said second train of pulses to the base electrode of said second transistor with a sense causing said second transistor to be non-conductive only during appearances of the pulses of said second train.

5. Apparatus in accordance with claims 3 or 4 also including a capacitor coupled between said first and second terminals.

* * * * *